(12) United States Patent
Chen et al.

(10) Patent No.: US 11,873,566 B2
(45) Date of Patent: Jan. 16, 2024

(54) CU/CU₂O INTERFACE NANOSTRUCTURES FOR ELECTROCHEMICAL CO₂ REDUCTION

(71) Applicants: Honda Motor Co., Ltd., Tokyo (JP); Utah State University, Logan, UT (US)

(72) Inventors: Gugang Chen, Powell, OH (US); Yi Rao, North Logan, UT (US); Xia Li, North Logan, UT (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/428,006

(22) PCT Filed: Feb. 26, 2020

(86) PCT No.: PCT/US2020/019814
§ 371 (c)(1),
(2) Date: Aug. 3, 2021

(87) PCT Pub. No.: WO2020/176575
PCT Pub. Date: Sep. 3, 2020

(65) Prior Publication Data
US 2022/0119966 A1 Apr. 21, 2022

Related U.S. Application Data

(60) Provisional application No. 62/811,688, filed on Feb. 28, 2019.

(51) Int. Cl.
*C25B 11/091* (2021.01)
*C25B 3/26* (2021.01)
(Continued)

(52) U.S. Cl.
CPC ............. *C25B 11/091* (2021.01); *C25B 3/07* (2021.01); *C25B 3/26* (2021.01); *C25B 9/17* (2021.01)

(58) Field of Classification Search
None
See application file for complete search history.

(56) References Cited

U.S. PATENT DOCUMENTS

| 5,252,355 A | 10/1993 | Ando et al. |
| 6,921,712 B2 | 7/2005 | Soininen et al. |

(Continued)

FOREIGN PATENT DOCUMENTS

| CN | 103042231 | 4/2013 |
| CN | 102502772 | 12/2013 |

(Continued)

OTHER PUBLICATIONS

Notice of Allowance of U.S. Appl. No. 16/800,966 dated Feb. 4, 2022, 16 pages.

(Continued)

*Primary Examiner* — Wojciech Haske
(74) *Attorney, Agent, or Firm* — Mark E. Duell; RANKIN, HILL & CLARK LLP

(57) ABSTRACT

A method of electrochemical reduction of $CO_2$ includes the use of a catalyst of $Cu/Cu_2O$ particles including $Cu/Cu_2O$ interfaces. The catalyst may be included in an electrochemical cell for the conversion of $CO_2$ to value-added products. The electrochemical cell may include an anode, a cathode including the $Cu/Cu_2O$ particles including $Cu/Cu_2O$ interfaces, and an aqueous medium containing $CO_2$ or $CO_3^{-2}$. The $CO_2$ or $CO_3^{-2}$ is reduced by contacting the $Cu/Cu_2O$ particles with the aqueous medium while supplying electricity to the cell. The conversion of $CO_2$ by the electro- (Continued)

chemical reduction thereof has higher Faradaic Efficiency due to the $Cu/Cu_2O$ interfaces in the $Cu/Cu_2O$ particles.

13 Claims, 6 Drawing Sheets

(51) Int. Cl.
   *C25B 3/07* (2021.01)
   *C25B 9/17* (2021.01)

(56) References Cited

U.S. PATENT DOCUMENTS

| | | |
|---|---|---|
| 8,900,659 B2 | 12/2014 | Zeng et al. |
| 2004/0221685 A1 | 11/2004 | Jeong et al. |
| 2006/0235087 A1 | 10/2006 | Alexandridis et al. |
| 2014/0060639 A1 | 3/2014 | Zeira et al. |
| 2015/0136613 A1 | 5/2015 | Li et al. |
| 2015/0259305 A1 | 9/2015 | Huang et al. |
| 2018/0119296 A1 | 5/2018 | Geioushy et al. |
| 2019/0202762 A1 | 7/2019 | Wu et al. |

FOREIGN PATENT DOCUMENTS

| | | |
|---|---|---|
| CN | 105879887 | 8/2016 |
| CN | 106378141 | 2/2017 |

OTHER PUBLICATIONS

V. Andal, G. Buvaneswari. "Effect of reducing agents in the conversion of Cu2O nanocolloid to Cu nanocolloid," Engineering Science and Technology, an International Journal, vol. 20, Issue 1, Feb. 2017, pp. 340-344.
De Brito, J. F.; da Silva, A. A.; Cavalheiro, A. J.; Zanoni, M. V. B. "Evaluation of the Parameters Affecting the Photoelectrocatalytic Reduction of CO2 to CH3OH at Cu/Cu2O Electrode." Int. J. Electrochem. Sci. 2014, 9, 5961-5973.
Handoko et al. Controllable proton and CO2 photoreduction over Cu2O with various morphologies, International Journal of Hydrogen Energy, vol. 38, Issue 29, Sep. 30, 2013, pp. 13017-13022.
Huang et al., 'Synthesis of Cu2O Nanocrystals from Cubic to Rhombic Dodecahedral Structures and Their Comparative Photocatalytic Activity', Journal of the American Chemical Society, vol. 134, Dec. 14, 2011 (Dec. 14, 2011), p. 1261-1267.
Jewell et al. Photodegradation study of Copper (I) Oxide nanoparticles synthesized with different geometries, https://www.vanderbilt.edu/vinse/docs/NSF-REU-Erik-Jewell- Poster.pdf.
Kas et al. Electrochemical CO2 reduction on Cu2O-derived copper nanoparticles: Controlling the catalytic selectivity of hydrocarbons, Phys. Chem. Chem. Phys., 2014, 16, 12194.
Kauffman, D. R.; Ohodnicki, P. R.; Kail, B. W.; Matranga, C. "Selective electrocatalytic activity of ligand stabilized copper oxide nanoparticles." The Journal of Physical Chemistry Letters 2011, 2 (16), 2038-2043.
Kim, D.; Kley, C. S.; Li, Y.; Yang, P. "Copper nanoparticle ensembles for selective electroreduction of CO2 to C2—C3 products." Proceedings of the National Academy of Sciences 2017, 114 (40), 10560-10565.
Kuhl, K. P.; Cave, E. R.; Abram, D. N.; Jaramillo, T. F. "New insights into the electrochemical reduction of carbon dioxide on metallic copper surfaces." Energy & Environmental Science 2012, 5 (5), 7050-7059.
Alec LaGrow, Michael Ward, David Lloyd, Pratibha Gai and Edward D. Boyes. "Visualizing the Cu/Cu2O Interface Transition in Nanoparticles with Environmental Scanning Transmission Electron Microscopy," J. Am. Chem. Soc., 2017, 139, 179-185.
Lee et al, 'Electrocatalytic Production of C3—C4 Compounds by Conversion of CO2 on a Chloride-Induced Bi-Phasic Cu2O—Cu Catalyst', Angewandte Chemie Interantional Edition, vol. 54, Oct. 16, 2015 (Oct. 16, 2015), p. 14701-14705 and associated Supporting Information.
Liang et al. Shape-controlled synthesis of polyhedral 50-facet Cu2O microcrystals with high-index facets, CrystEngComm, Jun. 2012, 14, 4431-4436.
Shlomo Magdassi, Michael Grouchko and Alexander Kamyshny. "Copper Nanoparticles for Printed Electronics: Routes Towards Achieving Oxidation Stability," Materials 2010, 3, 4626-4638.
Pal et al. Faceted Metal and Metal Oxide Nanoparticles: Design, Fabrication and Catalysis, Nanoscale, 2015, 7, 14159.
Pérez-Gallent, E.; Marcandalli, G.; Figueiredo, M. C.; Calle-Vallejo, F.; Koper, M. T. "Structure-and Potential-Dependent Cation Effects on CO Reduction at Copper Single-Crystal Electrodes." Journal of the American Chemical Society 2017, 139 (45), 16412-16419.
Sun et al, 'Facet-selective growth of Cu—Cu2O heterogeneous architectures', CrystalEngComm, vol. 14, Sep. 20, 2011 (Sep. 20, 2011), p. 40-43 and associated Electronic Supplementary Information.
Wang, X.; Varela, A. S.; Bergmann, A.; Kuehl, S.; Strasser, P. "Catalyst particle density controls hydrocarbon product selectivity in CO2 electroreduction on CuOx." ChemSusChem 2017.
Gang Wang, Hong Sun, Lu Ding, Gang Zhou and Zhong-Sheng Wang. "Growth of Cu particles on a Cu2O truncated octahedron: tuning of the Cu content for efficient glucose sensing," Phys. Chem. Chem. Phys. 2015, 17, 24361-24369.
Wang et al, 'Selectivity on Etching: Creation of High-Energy Facets on Copper Nanocrystals for CO2 Electrochemical Reduction', ACS Nano, vol. 10, Mar. 14, 2016 (Mar. 14, 2016), p. 4559-4564.
Zhang Qiu-li, Yang Zhi-mao, Ding Bing-jun, LAN Xin-zhe, Guo Ying-juan. "Preparation of copper nanoparticles by chemical reduction method using potassium borohydride," Trans. Nonferrous Met. Soc. China 20 (2010) S240-S244.
International Search Report and Written Opinion of PCT/US2020/019814 dated May 22, 2020, 13 pages.
Aslam, Mohammed, et al., "Formation of Cu and Cu2O nanoparticles by variation of the surface ligand: preparation, structure, and insulating-to-metallic transition." Journal of colloid and interface science 255.1 (2002): 79-90.
Bao et al., "Shape-Dependent Reducibility of Cuprous Oxide Nanocrystals," J. Phys. Chem. C 2010, 114, 6676-6680.
Bugayong, Joel Niño Galvez, "Electrochemical Reduction of CO2 on Support Cu2O Catalysts" (2014). LSU Doctoral Dissertations. 2858. http://digitalcommons.lsu.edu/gradschool_dissertations/2858.
Eilert, A.; Cavalca, F.; Roberts, F. S.; Osterwalder, J. r.; Liu, C.; Favaro, M.; Crumlin, E. J.; Ogasawara, H.; Friebel, D.; Pettersson, L. G. "Subsurface oxygen in oxide-derived copper electrocatalysts for carbon dioxide reduction." The journal of physical chemistry letters 2016, 8 (1), 285-290.
Gawande et al., "Cu and Cu-Based Nanoparticles: Synthesis and Applications in Catalysis," Chem. Rev. 2016, 116, 3722-3811.
Gou et al., "Solution-Phase Synthesis of Cu2O Nanocubes," 2003 American Chemical Society, Nano Letters, 2003, 3 (2), pp. 231-234.
Hori, Y.; Koga, O.; Yamazaki, H.; Matsuo, T. "Infrared spectroscopy of adsorbed CO and intermediate species in electrochemical reduction of CO2 to hydrocarbons on a Cu electrode." Electrochimica acta 1995, 40 (16), 2617-2622.
Hua et al., "Crystal Plane-Dependent Compositional and Structural Evolution of Uniform Cu2O Nanocrystals in Aqueous Ammonia Solutions," J. Phys. Chem. C 2011, 115, 201618-20627.
Qing Hua et al., "Morphological Evolution of Cu2O Nanocrystals in an Acid Solution: Stability of Different Crystal Planes", Langmuir, vol. 27, No. 2, Jan. 18, 2011, pp. 665-671.
Tuan, T.N., Simon, P., Benayad, A., Guetaz, L., Artero, V., and Fontecave, M. "Cu/Cu2O Electrodes and CO2 Reduction to Formic Acid: Effects of Organic Additives on Surface Morphology and Activity." Chemistry-A European Journal. 2016, 22 (39), 14029-14035.
Janáky, C., Hursán, D., Endrodi, B., Chanmanee, W., Roy, D., Liu, D., de Tacconi, N., Dennis, B.H., Rajeshwar, K. "Electro-and

(56) References Cited

OTHER PUBLICATIONS photoreduction of carbon dioxide: The twain shall meet at copper oxide/copper interfaces." ACS Energy Letters. 2016, 1 (2), 332-338.

Kuo et al., "Fabrication of Truncated Rhombic Dodecahedral $Cu_2O$ Nanocages and Nanoframes by Particle Aggregation and Acid Etching," J. Am. Chem. Soc. 2008, 130, 12815-12820.

Kuo et al., "Seed-Mediated Synthesis of Monodispersed $Cu_2O$ Nanocubes with Five Different Size Ranges from 40 to 420 nm," Adv. Func t. Mater. 2007, 17, 3773-3780.

Le, M., Ren, M., Zhang, Z., Sprunger, P.T., Kurtz, R. L., Flake, J.C. "Electrochemical reduction of $CO_2$ to $CH_3OH$ at copper oxide surfaces." Journal of the Electrochemical Society. 2011, 158 5), E45-E49.

Li, C.W., Kanan, M.W. "$CO_2$ reduction at low overpotential on Cu electrodes resulting from the reduction of thick $Cu_2O$ films." Journal of the American Chemical Society 2012, 134 (17), 7231-7234.

Lum, Y., Yue, B., Lobaccaro, P., Bell, A.T., Ager, J.W. "Optimizing C—C coupling on oxide-derived copper catalysts for electrochemical $CO_2$ reduction." The Journal of Physical Chemistry C. 2017, 121 (26), 14191-14203.

Luo, Xiaolin, et al., "Sonochemical synthesis of porous $Cu_2O$—Cu hollow spheres and their photo-catalysis." Materials Chemistry and Physics .151 (2015): 252-258.

Ma, M., Djanashvili, K., Smith, W.A. "Selective electrochemical reduction of $CO_2$ to CO on CuO-derived Cu nanowires." Physical Chemistry Chemical Physics. 2015, 17 (32), 20861-20867.

Nie, X., Griffin, G.L., Janik, M.J., Asthagiri, A. "Surface phases of $Cu_2O$ (111) under $CO_2$ electrochemical reduction conditions." Catalysis Communications. 2014, 52, 88-91.

Ping, Tao, et al., "Enhanced photocatalytic activity of $Cu_2O$/Cu heterogeneous nanoparticles synthesized in aqueous colloidal solutions on degradation of methyl orange." Rare Metal Materials and Engineeering. 45.9 (2016): 2214-2218.

Qiao, J., Liu, Y., Hong, F., Zhang, J. "A review of catalysts for the electroreduction of carbon dioxide to produce low-carbon fuels." Chemical Society Reviews. 2014, 43 (2), 631-675.

Ren, D., Deng, Y., Handoko, A.D., Chen, C.S., Malkhandi, S., Yeo, B.S. "Selective electrochemical reduction of carbon dioxide to ethylene and ethanol on copper (I) oxide catalysts." ACS Catalysis. 2015, 5 (5), 2814-2821.

Roberts, F.S., Kuhl, K.P., Nilsson, A. "Electroreduction of carbon monoxide over a copper nanocube catalyst: surface structure and pH dependence on selectivity." ChemCatChem. 2016, 8 (6), 1119-1124.

Wang, L., Gupta, K., Goodall, J.B., Darr, J.A., Holt, K. B. "In situ spectroscopic monitoring of $CO_2$ reduction at copper oxide electrode." Faraday discussions. 2017, 197, 517-532.

Yang, Ai-ling, et al. "Fabrication of $Cu_2O$@ $Cu_2O$ core-shell nanaoparticles and conversion to $Cu_2O$@ Cu core-shell nanoparticles in solution." Transactions of Nonferrous Metals Society of China. 25.11 (2015): 3643-3650.

Zhang, Y., Deng, B., Zhang, T., Gao, D. and Xu, A. "Shape Effects of $Cu_2O$ Polyhedral Microcrystals on Photocatalytic Activity." J. Phys. Chem. C. 2010, 114, 11, 5073-5079.

Dong-Feng Zhang et al., "Delicate control of crystallographic facet-oriented $Cu_2O$ nanocrystals and the correlated adsorption ability", Journal of Materials Chemistry, vol. 19, No. 29, Jan. 1, 2009, pp. 5220-5225.

Extended European Search Report of European Serial No. 18186469.5 dated Dec. 3, 2018, 8 pages.

Notice of Allowance of U.S. Appl. No. 16/800,966 dated Oct. 4, 2021, 6 pages.

Zhang, M. & Huo, D. & Sun, X.-D & Kang, Y. (2017). Preparation of Cu micro/nanoparticles with ascorbic acid by liquid phase reduction method. Zhongguo Youse Jinshu Xuebao/Chinese Journal of Nonferrous Metals. 27. 747-752. (Cited in Chinese Office Action and Search Report of CN201810859393.X dated Nov. 10, 2021 with English translation).

CU/CU$_2$O INTERFACE NANOSTRUCTURES FOR ELECTROCHEMICAL CO$_2$ REDUCTION

BACKGROUND

Global energy consumption is primarily reliant on the burning of fossil fuels, but sustainable alternatives need to be developed to guarantee a long-term economic growth while mitigating environmental problems from increases in anthropogenic emissions of carbon dioxide (CO$_2$). To address this concern while simultaneously addressing rising concentrations of atmospheric CO$_2$, there has been proposed the electrochemical reduction of carbon dioxide to carbon-based value-added products, which themselves can be used as fuels or fuel precursors. A cost-effective process for the electrochemical conversion of carbon dioxide to value-added products may require electro-catalysts that are efficient, selective, and stable.

Nobel metals are potentially candidates for electro-catalysts for the conversion of CO$_2$. Copper is an inexpensive metal, and thus a potential candidate for being an electro-catalyst, and copper nanostructures possess more surfaces and active sites for electrochemical CO$_2$ reduction.

While cuprous oxide (Cu$_2$O) is a good photocatalyst, copper (Cu) is a good electrocatalyst. Both of these catalysts are used for the reduction of CO$_2$. However, although metallic Copper (Cu) is potentially a good electro-catalyst for CO$_2$ reduction, oxidation of Cu surface impedes the electro-catalytic activity. Therefore, unintentional oxidation of Cu is detrimental to the electrochemical CO$_2$ reduction, in particular, increasing overpotential of the reduction.

On the other hand, cuprous oxide (Cu$_2$O) can efficiently couple with hydrogen in the process of electrochemical CO$_2$ reduction. Cuprous oxide (Cu$_2$O) is one of the three stable oxide forms of Cu which have an oxidation state of +1. Cu$_2$O has a lattice constant of 4.2696 Å. Cu atoms are arranged in a face-centered manner while O atoms are arranged in a body-centered manner. Cu atoms are linearly coordinated to two O atoms while O atoms are tetrahedrally coordinated to four Cu atoms. Previous studies were mainly focused on the synthesis of Cu$_2$O on Cu films. However, studies on the surface areas and active sites on Cu films are lacking.

BRIEF DESCRIPTION

According to one aspect, a method of electrochemical reduction of CO$_2$ includes providing an electrochemical cell including an anode, and a cathode including Cu/Cu$_2$O particles with Cu/Cu$_2$O interfaces. An aqueous medium containing CO$_2$ or CO$_3^{-2}$ is introduced into the cell. The CO$_2$ or CO$_3^{-2}$ is reduced by contacting the particles with the aqueous medium while supplying electricity to the cell.

According to another aspect, electrochemical cell for electrochemical reduction of CO$_2$ or CO$_3^{-2}$ includes an anode; a cathode including Cu/Cu$_2$O particles having Cu/Cu$_2$O interfaces; an electrolyte arranged between the anode and the cathode; and an aqueous medium containing CO$_2$ or CO$_3^{-2}$ in contact with the cathode.

DETAILED DESCRIPTION

Figure 1:
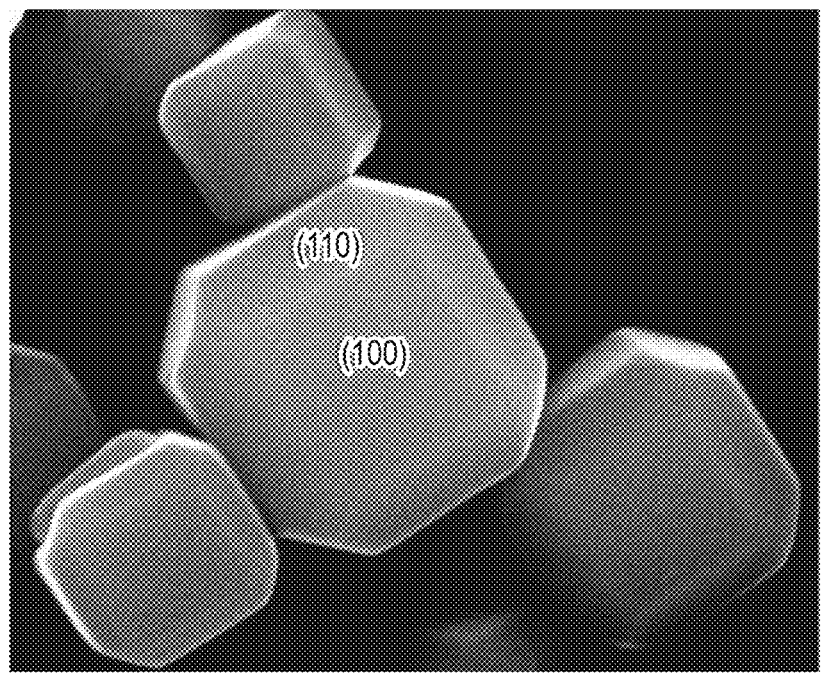
FIG. 1 is an SEM image of Cu$_2$O crystals.

The present subject matter includes copper oxide nanostructures (also referred to herein as crystals) being subject to a controlled reaction so as to only partially reduce the copper oxide (Cu$_2$O) to elemental copper (Cu), which thereby forms Cu/Cu$_2$O structures (also referred to as particles) including both elemental copper and copper oxide.

The Cu/Cu$_2$O particles have high-energy interfaces between the Cu and the Cu$_2$O, which interfaces are referred to herein as Cu/Cu$_2$O interfaces. The Cu/Cu$_2$O interfaces provide active sites for CO$_2$ electroreduction. The Cu/Cu$_2$O interfaces minimize their free energy by reconstruction, and enhance molecular adsorption and activation on adsorbate-covered atomically rough interfaces during CO$_2$ electrochemical reduction. The Cu/Cu$_2$O particles employ the advantages of both Cu and Cu$_2$O chemical activity because they include both elemental copper and copper oxide. The Cu/Cu$_2$O particles can be used in electrochemical CO$_2$ reduction by way of the high-energy active sites at their Cu/Cu$_2$O interfaces, which provide a more efficient conversion of CO$_2$ for producing value-added products such as ethylene glycol, formic acid (HCOOH), methanol (CH$_3$OH), ethylene (C$_2$H$_4$), methane (CH$_4$), ethane (C$_2$H$_6$), or carbon monoxide (CO).

The present subject matter includes a method of forming Cu/Cu$_2$O particles including Cu/Cu$_2$O interfaces. The method includes reacting Cu$_2$O crystals (see for example, FIGS. 1-4 and 10) with a reducing agent so as to not entirely reduce the Cu$_2$O crystals to elemental Cu, and instead only partially reduce the Cu$_2$O crystals so that some Cu$_2$O is retained and some is reduced to elemental Cu, thereby forming the Cu/Cu$_2$O particles having Cu/Cu$_2$O interfaces (see for example, FIGS. 5-9 and 11).

The Cu$_2$O crystals that are reduced to form Cu/Cu$_2$O particles, may themselves be synthesized as part of the method, or they may be purchased from a supplier or acquired as naturally occurring crystals.

If synthesized, the Cu$_2$O crystals may be formed by a wet chemical process under agitation, by preparing a solution including a copper ion contributor dissolved in a solvent, heating the solution to a temperature of from 30-100° C., adding a pH adjuster to the solution so that the solution has a pH of from 2-12, adding a reducing agent to the solution to thereby form a reaction mixture, and reacting the reaction mixture at the temperature of from 30-100° C. for a time of from 1-1000 minutes to thereby precipitate the Cu$_2$O crystals from the reaction mixture.

The solvent may include any liquid capable of solubilizing the other raw materials, and can include tap or deionized water, aqueous ammonia solutions, or an organic solvent such as methanol, ethanol, acetone, ether, or glycerol for example. In one non-limiting embodiment, the solvent includes deionized water.

The copper ion contributor may be any substance that is capable of contributing copper ions ($Cu^{2+}$), including for example, a copper salt or hydrate thereof. The copper salt can include for example copper (II) chloride ($CuCl_2$), copper (II) fluoride ($CuF_2$), copper (II) chloride ($CuCl_2$), copper (II) bromide ($CuBr_2$), copper (II) iodide ($CuI_2$), cuprous iodide (CuI), copper (II) oxide (CuO), copper (II) sulfide (CuS), copper (II) sulfate ($CuSO_4$), copper (II) nitride ($Cu_3N_2$), copper(II) nitrate ($Cu(NO_3)_2$), copper (II) phosphide ($Cu_3P_2$), copper (II) acetate ($Cu(CH_3COO)_2$), copper (II) hydroxide ($CuOH)_2$, copper(II) carbonate ($CuCO_3$), and copper (II) acetylacetonate ($Cu(C_5H_7O_2)_2$), or combinations thereof. In a non-limiting example, the copper ion contributor includes copper (II) acetate hydrate ($Cu(CH_3COO)_2 \cdot H_2O$).

The copper ion contributor can be added to the solvent as a solid that is then dissolved therein. The amount of the copper ion contributor used in the reaction is not critical, and the copper ion contributor can be included at an amount to provide a molar concentration in the reaction mixture of 1-40 mM. The copper ion contributor may also be included to provide a molar concentration of 5-15 mM, or 9-11 mM, or 10 mM in the reaction mixture. In one non-limiting example, the copper ion contributor is copper (II) acetate hydrate, and is included in an amount to provide a molar concentration of 35-40 mM in the reaction mixture to synthesize $Cu_2O$ crystals.

The temperature at which the $Cu_2O$ crystals are synthesized may range from 30–100° C., 40-80° C., or 55-65° C.

The pH adjuster may include various acids, bases, or combinations thereof, such as sodium hydroxide (NaOH) or ammonia for example. The pH adjustor may be used to adjust the pH of the reaction mixture to be between 2.0 and 12.0. The pH adjustor may be introduced as a solid for dissolution in the solvent, or as a solution, such as an aqueous solution after the pH adjustor has been dissolved in water. In one non-limiting example, the pH adjustor includes sodium hydroxide, which may be introduced as an aqueous solution to have a molar concentration of sodium hydroxide in the reaction mixture of 10-1000 mM, 100-800 mM, or 500-700 mM. In a non-limiting aspect, a sodium hydroxide aqueous solution is introduced in an amount to provide a molar concentration of 550-650 mM in the reaction mixture.

The reducing agent may include for example, L-ascorbic acid (i.e. vitamin C, or $C_6H_8O_6$), hydrazine monohydrate, sodium borohydride, hydrazine, 1,2-hexadecanediol, glucose, carbon monoxide, sulfur dioxide, iodides, hydrogen peroxide, oxalic acid, formic acid, carbon, reducing sugars, a borane compound, or combinations thereof.

The reducing agent may be added to the solvent as a solid for dissolution therein, or in a solution, such as an aqueous solution including the reducing agent dissolved in water. In one non-limiting example, the reducing agent is added to the solvent as a solution. The reducing agent may be added in an amount to provide a molar concentration in the reaction mixture of 1-100 millimoles per liter of reaction mixture (i.e. mmol/L or millimolar (mM)), 20-80 mM, or 30-50 mM. In one non-limiting example, the reducing agent includes L-ascorbic acid, which may be introduced as an aqueous solution in an amount to provide a molar concentration of 30-35 mM in the reaction mixture.

The reaction mixture may be reacted for a time of from 1-1000 minutes, 1-100 minutes, or 5-30 minutes.

The $Cu_2O$ crystals are not particularly limited, and may be of any size, include any number of facets, and may have facets of the same type (i.e. same Miller index) or have facets of different types (i.e. different Miller indices). The size of the $Cu_2O$ crystals may range, for example, from 1 nm to 100 μm, or 10 nm to less than 1 μm (i.e. nanosized). The number of facets may range from 4-100. The number of types of facets may range from 1-100. In one non-limiting example, the $Cu_2O$ crystals have an average size of 700-900 nm, have eighteen facets, and have two different types of facets, i.e. twelve (110) facets and six (100) facets. The size of the $Cu_2O$ crystals may determine, as least to some extent, the size of the $Cu/Cu_2O$ particles, which are produced from the $Cu_2O$ crystals. If the size of the $Cu_2O$ crystals are nanosized, then the size of the subsequently produced $Cu/Cu_2O$ particles may also be nanosized.

The $Cu_2O$ crystals may be reacted with a reducing agent to synthesize the $Cu/Cu_2O$ particles having $Cu/Cu_2O$ interfaces. However, in this process the $Cu_2O$ crystals may not be totally reduced to Cu, and instead only partially reduce to thereby form elemental copper and leave some unreacted copper oxide, thus producing the $Cu/Cu_2O$ particles. The molarity of the reducing agent present in the reaction, the duration of the reaction, the temperature at which the reaction takes place, or a combination thereof may be regulated so that the $Cu_2O$ crystals are not fully reduced to elemental Cu. Instead, the $Cu_2O$ crystals are only partially reduced so that the finished product of $Cu/Cu_2O$ nanoparticles includes both elemental Cu and $Cu_2O$, with interfaces between them.

The synthesis of $Cu/Cu_2O$ may be performed by a wet chemical process using a liquid under agitation. The liquid may include tap or deionized water, aqueous ammonia solutions, or an organic solvent such as methanol, ethanol, acetone, ether, or glycerol for example. In one non-limiting embodiment, the liquid includes deionized water.

The $Cu_2O$ crystals may be reacted with a reducing agent in the liquid for a predetermined time and at a predetermined temperature. The predetermined temperature may range from 40–80° C., 50-70° C., or 55-65° C. The predetermined time may range from 1-60 minutes, 1-30 minutes, 1-10 minutes, or 1-5 minutes.

The reducing agent is included to donate electrons (by oxidation of the reducing agent) that are used for the reduction of the $Cu_2O$ to produce elemental Cu. The reducing agent may include those used to synthesize the $Cu_2O$ crystals disclosed herein. The reducing agent may be added in an amount to provide a molar concentration in the liquid of 10-2000 millimoles per liter of liquid (i.e. mmol/L or millimolar (mM)), 20-1000 mM, or 30-500 mM. In one non-limiting example, the reducing agent includes hydrazine hydrate ($N_2H_4 \cdot H_2O$) at a molar concentration in the liquid of 900-1000 mM.

After partial reduction of the $Cu_2O$ crystals, the resultant $Cu/Cu_2O$ particles may retain the general shape, size, number of facets, and types of facets of the $Cu_2O$ crystals. This is shown between FIG. 1 (showing $Cu_2O$ crystals) and FIG. 6 (showing $Cu/Cu_2O$ particles). However, the facets of the $Cu/Cu_2O$ particles may each present a rough surface (see FIGS. 6-7), as opposed to the smooth facets of the $Cu_2O$ crystals (See FIG. 1). Such rough surfaces on the facets of the $Cu/Cu_2O$ particles may be due to the reduction of $Cu_2O$ to Cu occurring on these surfaces. The interface between the $Cu_2O$ and the Cu on the surfaces of the $Cu/Cu_2O$ particles may provide actives sites for the electrochemical reduction of $CO_2$ to value-added products. Thus, the $Cu/Cu_2O$ interfaces present on the surface of the $Cu/Cu_2O$ particles may increase the Faradaic Efficiency of the $Cu/Cu_2O$ particles compared to Cu particles, $Cu_2O$ particles, or combinations thereof of similar amount and similar size.

The present subject matter includes a method of electrochemical reduction of $CO_2$ using the $Cu/Cu_2O$ particles including $Cu/Cu_2O$ interfaces. $CO_2$ may be reduced to value-added products such as ethylene glycol, formic acid (HCOOH), methanol ($CH_3OH$), ethylene ($C_2H_4$), methane ($CH_4$), ethane ($C_2H_6$), ethanol, carbon monoxide (CO), acetic acid, acetone, other organic compounds, or combinations thereof.

Electrochemical reduction of $CO_2$ may be performed by using the $Cu/Cu_2O$ particles as a catalyst for reducing the $CO_2$ to value-added products, and such a process may be performed in an electrochemical cell, where $CO_2$ or $CO_3^{-2}$ comes into contact with the $Cu/Cu_2O$ particles.

The electrochemical cell used for the reduction of $CO_2$ may include a cathode having the $Cu/Cu_2O$ particles including $Cu/Cu_2O$ interfaces. The electrochemical cell may further include an anode, an aqueous medium in contact with the cathode, an electrolyte arranged between the anode and the cathode, and other known components of electrochemical cells.

The aqueous medium may include carbon dioxide, which may be included in the aqueous medium by being bubbled through the aqueous medium or being dissolved in the aqueous medium. The aqueous medium may alternatively include carbonate ion ($CO_3^{-2}$), which may be formed by dissolving $CO_2$ in a basic solution, such as aqueous sodium hydroxide solution. The $CO_2$ or $CO_3^{-2}$ may be introduced into the cell, and reduced by contacting the $Cu/Cu_2O$ particles with the aqueous medium while supplying electricity to the cell, thereby producing value added products. The $Cu/Cu_2O$ particles may be arranged on a surface of the cathode so as to contact the aqueous medium.

By the electrochemical cell including $Cu/Cu_2O$ particles in the cathode, the Faradaic Efficiency of $CO_2$ conversion by the electrochemical cell may be increased compared to electrochemical cells including cathodes not having $Cu/Cu_2O$ particles.

Examples

As inventive examples, $Cu/Cu_2O$ particles including $Cu/Cu_2O$ interfaces according to the present invention were produced to evaluate them for use in the electrochemical reduction of $CO_2$. As a reference, a comparative example was prepared, including crystals of $Cu_2O$ alone.

Comparative Example 1: $Cu_2O$ crystals were synthesized by dissolving 0.6 g of $Cu(CH_3COO)_2 \cdot H_2O$ in 60 ml of doubly distilled $H_2O$ in a 250 ml flask under constant electromagnetic stirring. The flask was kept in a 60° C. oil bath. 10 ml of 4.8 M NaOH aqueous solution was added dropwise into the above blue solution and kept stirring for 10 min. Once NaOH was added, a precipitate appeared and the color of the solution gradually changed to dark brown. Then, 10 ml of 0.25 M vitamin C (ascorbic acid) aqueous solution was added into the above suspension and reacted for 20 min, by which a brownish-red product of $Cu_2O$ crystals was produced. The precipitate was separated from solution by centrifugation, washed with ethanol three times and water once, and dried at 50° C. under vacuum overnight.

Figure 2:
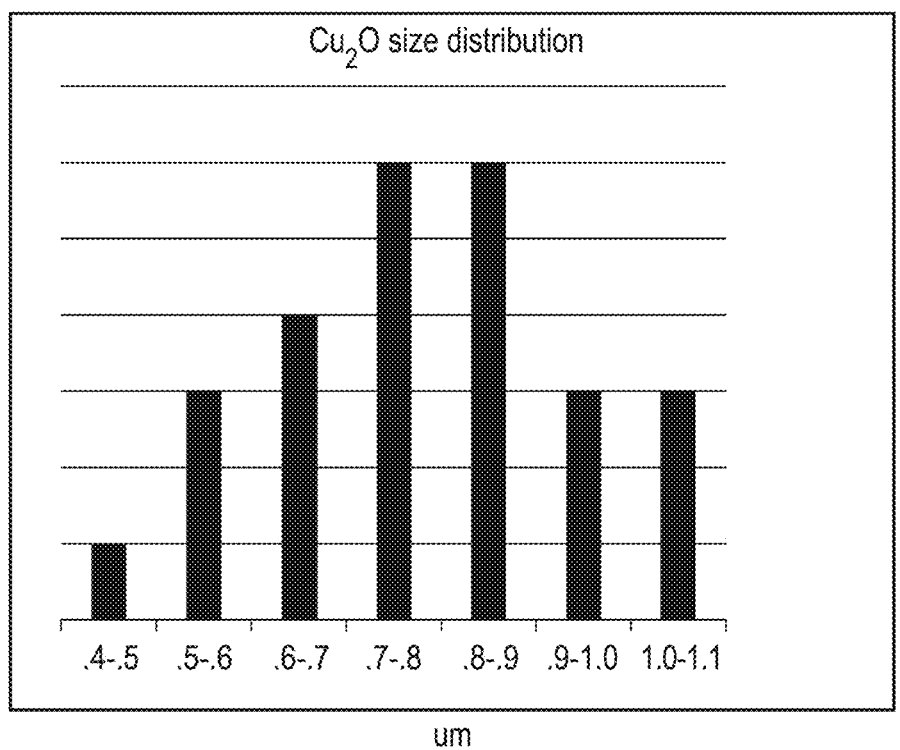
FIG. 2 is a size distribution chart for Cu$_2$O crystals of FIG. 1.
Figure 3:
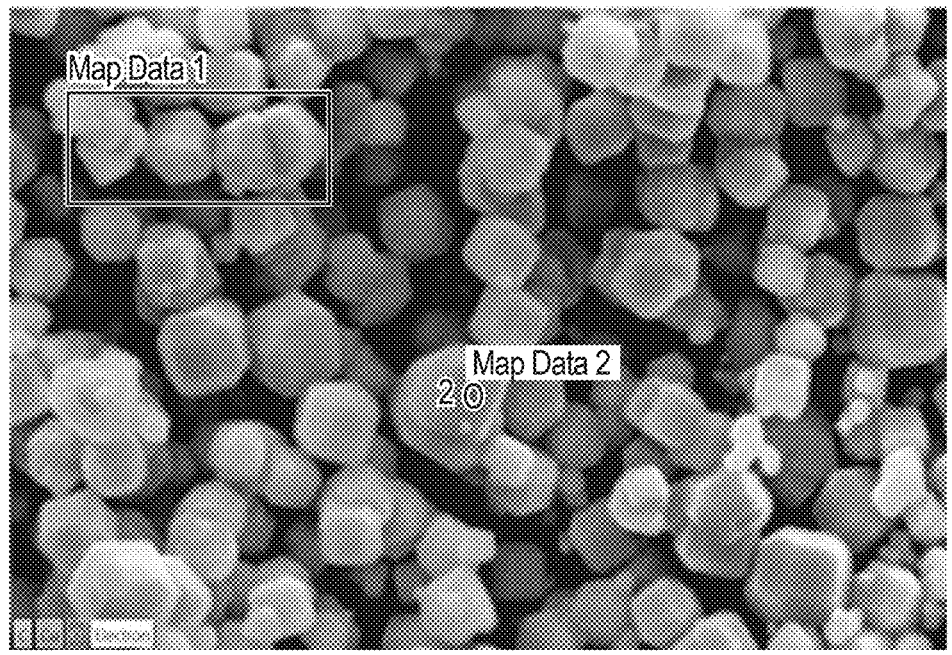
FIG. 3 is an EDS layered image of Cu$_2$O crystals of FIG. 1.
Figure 4:
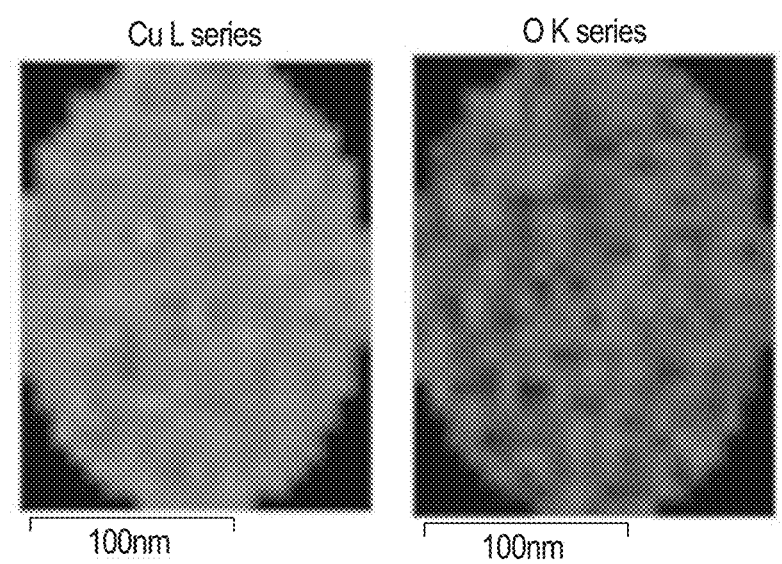
FIG. 4 is an EDS elemental mapping of the Cu$_2$O crystals of FIG. 1.
Figure 5:
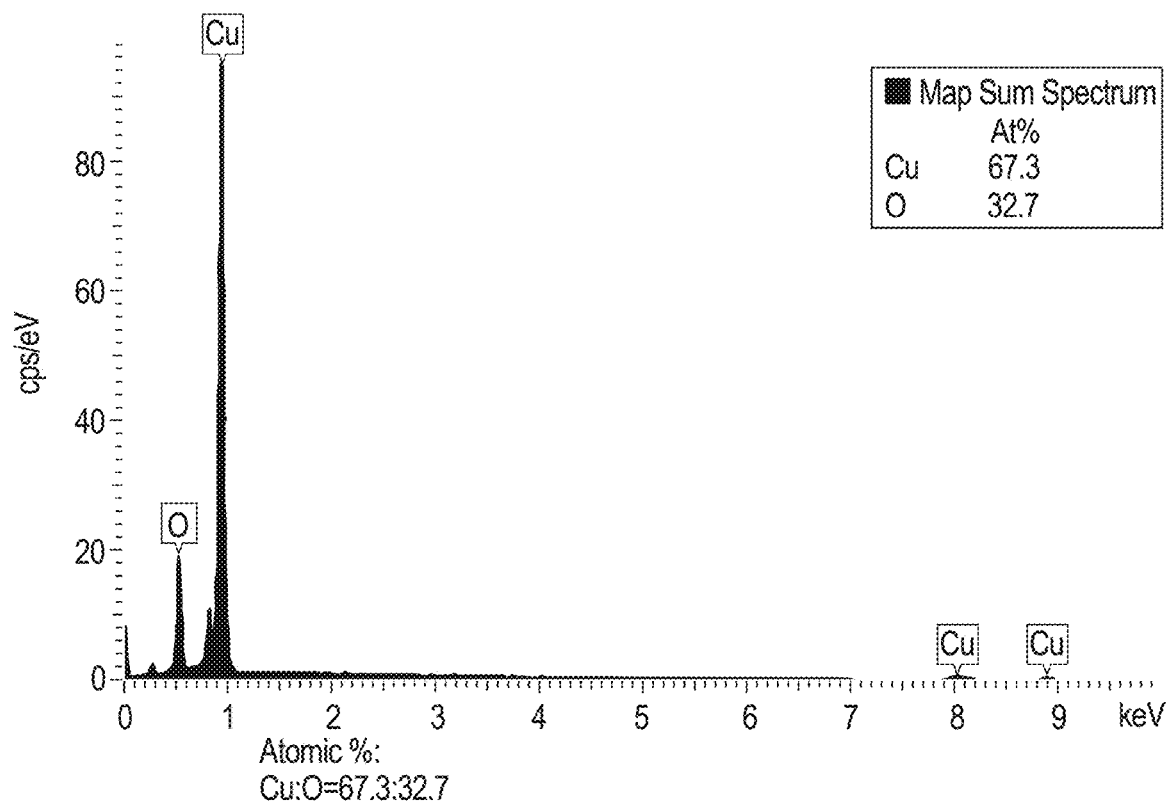
FIG. 5 is an EDS spectrum of the Cu$_2$O crystals of FIG. 1.

The structural properties of the synthesized $Cu_2O$ crystals were analyzed by SEM and energy dispersive X-ray. As seen in the SEM images of FIGS. 1 and 3, the $Cu_2O$ crystals are polyhedral structures with eighteen smooth facets, i.e. six (100) facets and twelve (110) facets. The size distribution of the $Cu_2O$ crystals is shown in FIG. 2, with an average particle size of about 800 nm±300 nm. FIG. 3 shows an Energy Dispersive Spectroscopy (EDS) layered image, and FIG. 4 shows an EDS elemental mapping of the $Cu_2O$ crystals. FIG. 5 shows an EDS spectrum of the $Cu_2O$ crystals. As can be seen, the atomic ratio of Cu:O in the $Cu_2O$ crystals is 67.3:32.7, or about 2:1.

Example 1: Some of the $Cu_2O$ crystals of Comparative Example 1 were used to form the $Cu/Cu_2O$ particles according to the present invention. In particular, 132 mg of $Cu_2O$ crystals of Comparative Example 1 was added to 40 ml doubly distilled $H_2O$ at room temperature and stirred for 10 min. Then, 2 ml of hydrazine hydrate ($N_2H_4 \cdot H_2O$) was added under magnetic stirring, and heated to 60° C. for 2 min to allow them to react and then passively allowed to cool to ambient temperature. This reaction caused the partial reduction of the $Cu_2O$ crystals to form the $Cu/Cu_2O$ particles. The resulting precipitate of $Cu/Cu_2O$ particles was purified by centrifugation, washed with deionized water three times and dried at 50° C. under vacuum overnight.

Figure 6:
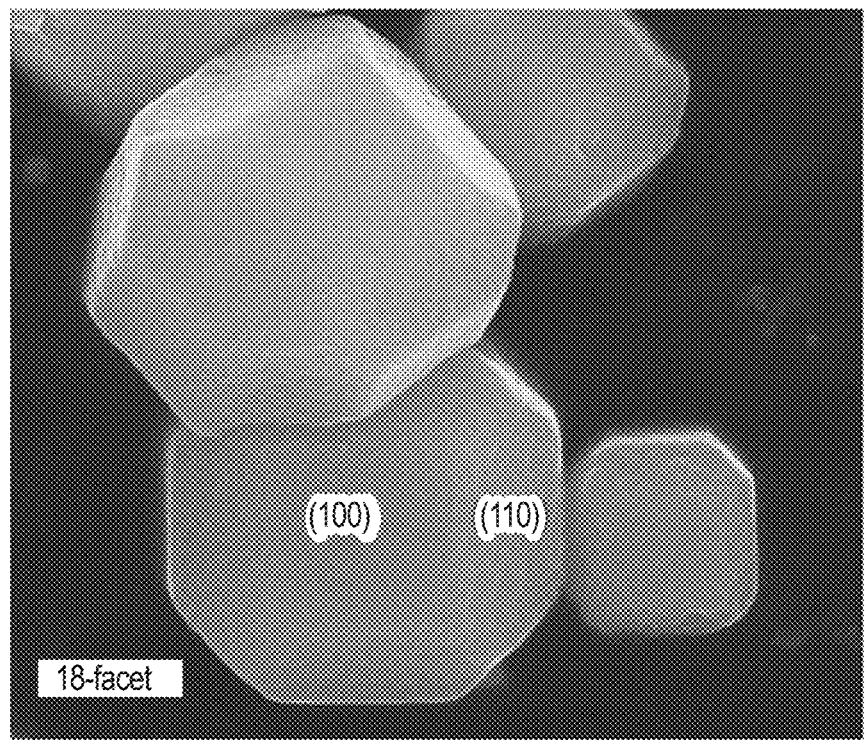
FIG. 6 is an SEM image of Cu/Cu$_2$O particles according to the present subject matter.
Figure 7:
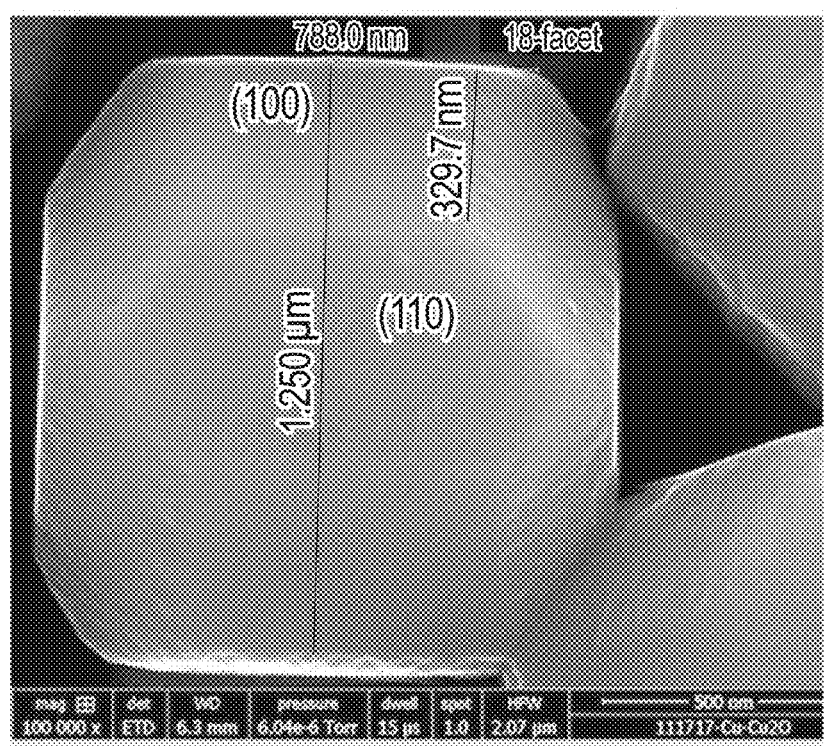
FIG. 7 is an SEM close up image of the Cu/Cu$_2$O particles of FIG. 6.
Figure 8:
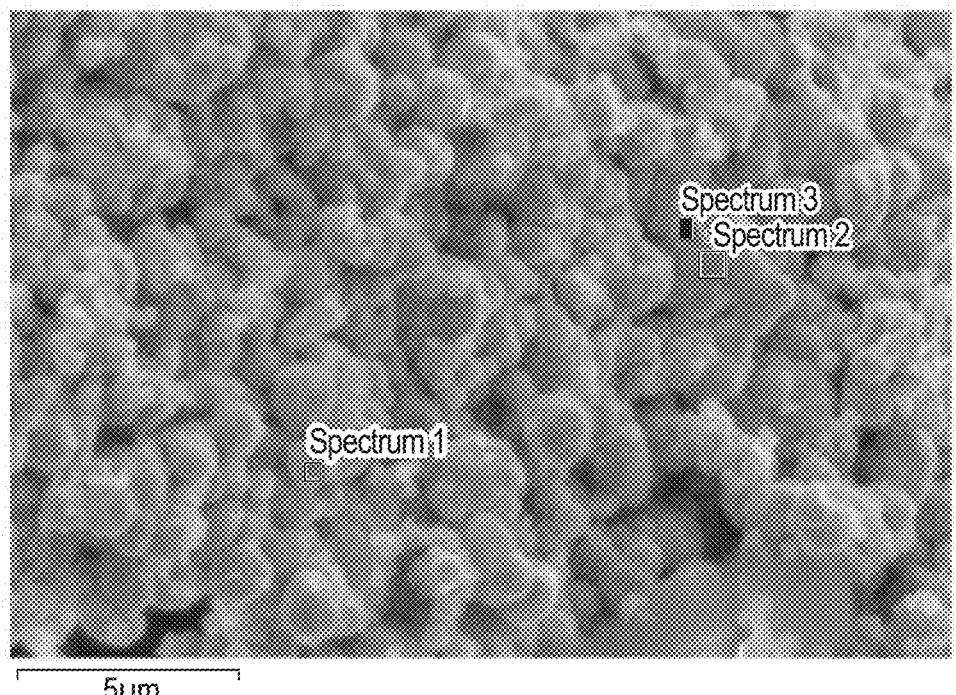
FIG. 8 is an SEM far away image of the Cu/Cu$_2$O particles of FIG. 6.
Figure 9:
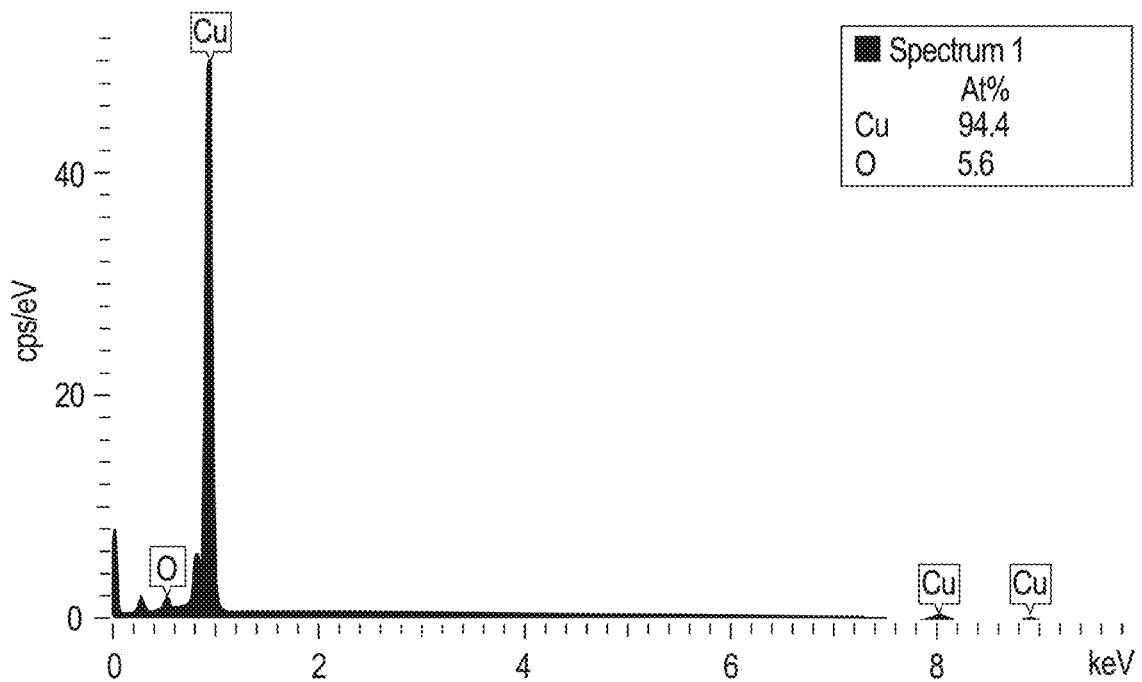
FIG. 9 is an EDS spectrum of the Cu/Cu$_2$O particles of FIG. 6.

The structural properties of the synthesized $Cu/Cu_2O$ particles were analyzed by SEM and energy dispersive spectroscopy. FIGS. 6-8 show SEM images of the $Cu/Cu_2O$ particles, which present facets with a rougher surface than the $Cu_2O$ crystals of Comparative Example 1. The $Cu/Cu_2O$ particles, like the $Cu_2O$ crystals of Comparative Example 1, are 18-facet polyhedral structures, with a representative size of about 788 nm×1.25 μm (FIG. 7). The EDS spectrum of FIG. 9 exhibits the characteristic peaks of Cu and O, and the atomic ratio of Cu:O is 94.4:5.6, which indicates that elemental Cu has been produced, and the percentage of copper dominates and oxygen exists. This ratio indicates that there is metallic copper produced in the process, which results in interfaces between the copper and the remaining copper oxide. Such interfaces between the copper and the copper oxide (i.e. $Cu/Cu_2O$ interfaces) will benefit electrocatalytic reduction of $CO_2$ and other applications.

Figure 10:
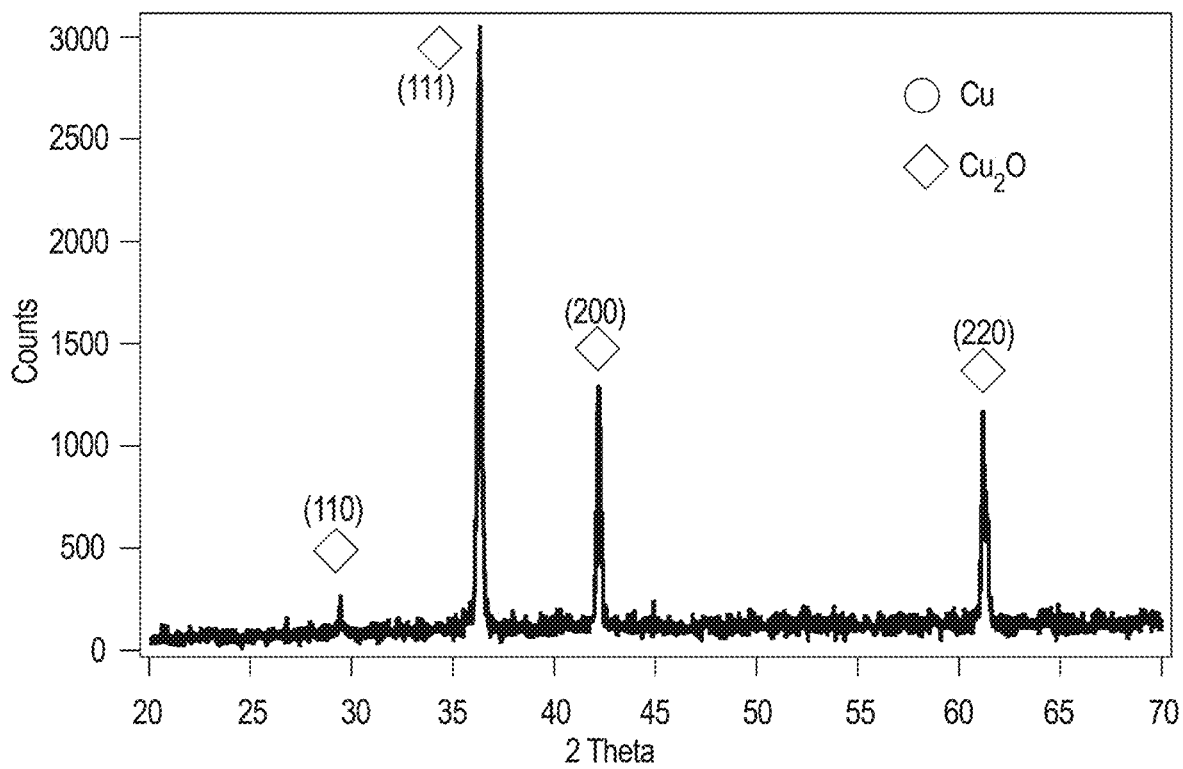
FIG. 10 is an XRD pattern of Cu$_2$O crystals of FIG. 1.
Figure 11:
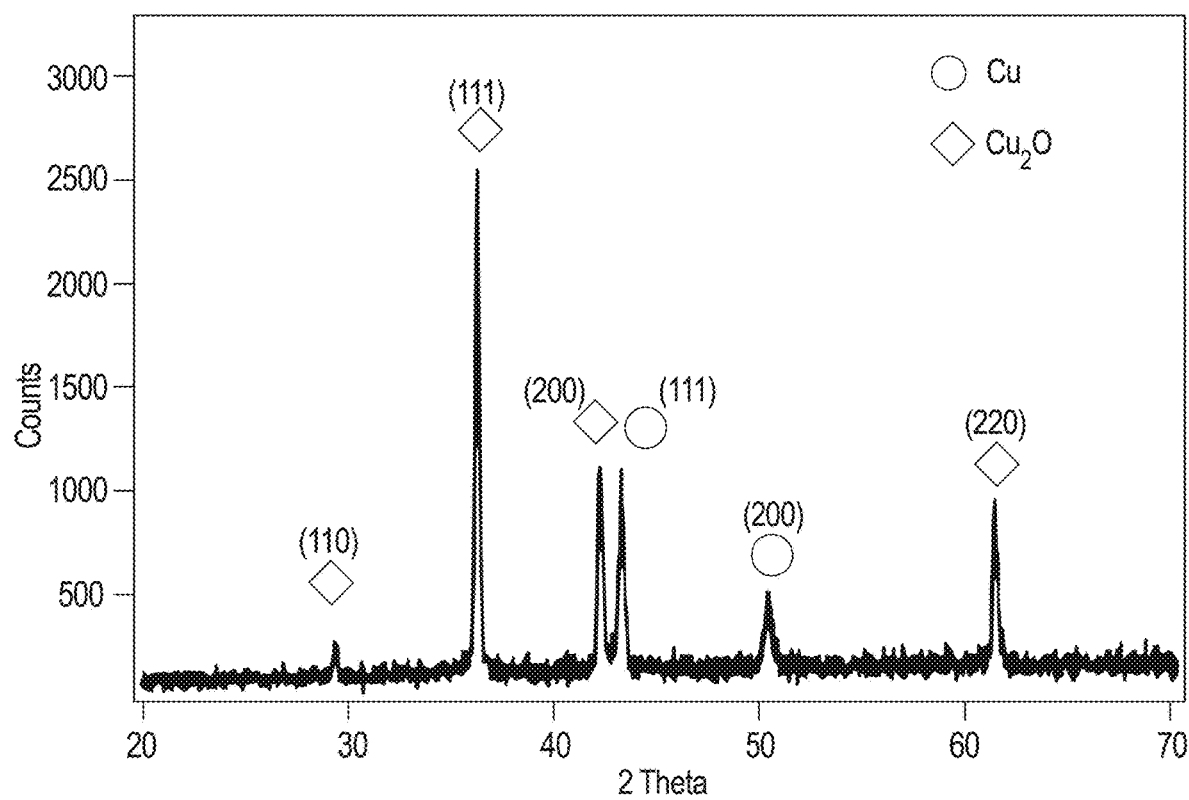
FIG. 11 is an XRD pattern of Cu/Cu$_2$O particles of FIG. 6.

FIG. 10 shows an X-Ray Diffraction (XRD) pattern of the $Cu_2O$ crystals of Comparative Example 1 before partial reduction to $Cu/Cu_2O$ particles. FIG. 11 shows an X-Ray diffraction patter of the $Cu/Cu_2O$ particles after being formed. It is seen that there are several peaks from Cu in the $Cu/Cu_2O$ particles of Example 1, while there are only peaks for $Cu_2O$ in Comparative Example 1.

Example 1 and Comparative Example 1 were then utilized in the electrochemical reduction of $CO_2$. One prominent feature of the electrochemical $CO_2$ reduction by $Cu/Cu_2O$ particles is that ethylene glycol, one of the value-added products for fuel, is generated with a low over-potential. Table 1 below compares Faradaic Efficiency (FE) of $CO_2$ reduction using $Cu/Cu_2O$ particles of Example 1 (which include $Cu/Cu_2O$ interfaces), with that of $Cu_2O$ crystals of Comparative Example 1 (which do not include $Cu/Cu_2O$ interfaces). All voltages are with respect to Ag/AgCl (pH=6.8).

TABLE 1

| | | Faradaic Efficiency (%) | | | | |
|---|---|---|---|---|---|---|
| | Potential (V) | Formic Acid | Ethylene Glycol | Acetic Acid | Ethanol | Acetone |
| Example 1 - $Cu/Cu_2O$ particles | −1.0 | 0.72 | 3.58 | 0.87 | 1.03 | 0.33 |
| | −0.9 | 0.19 | 1.95 | 0.65 | 0.39 | 0.12 |
| | −0.8 | 0.60 | 9.22 | 0.81 | 3.46 | 0.45 |

TABLE 1-continued

|  | Potential (V) | Faradaic Efficiency (%) | | | | |
|---|---|---|---|---|---|---|
|  |  | Formic Acid | Ethylene Glycol | Acetic Acid | Ethanol | Acetone |
|  | −0.7 | 3.1 | 7.65 | 1.06 | 4.46 | 1.82 |
|  | −0.6 | 1.58 | 15.88 | 3.56 | 2.63 | 0.22 |
|  | −0.5 | 1.21 | 10.7 | 0.96 | 3.90 | 0.78 |
| Comparative | −1.4 | 0.456 | 4.85 | 0.21 | 0.781 | 0.245 |
| Example 1 - | −1.2 | 0.528 | 4.89 | 0.30 | 0.564 | 0.151 |
| $Cu_2O$ | −1.1 | 0.46 | 3.97 | 0.38 | 0.413 | 0.141 |
| crystals | −1.0 | 1.03 | 12.92 | 0.495 | 1.978 | 0.757 |
|  | −0.9 | 0.297 | 13.16 | 0.358 | 1.573 | 0.358 |
|  | −0.8 | 0.959 | 10.93 | 0.33 | 1.24 | 0.319 |

It is seen that the FE for ethylene glycol increases from 13.16% for the $Cu_2O$ crystals of Comparative Example 1, to 15.88% with a lower over-potential for the $Cu/Cu_2O$ particles of Example 1. These results may be significant for commercial use because of the low over-potential of $CO_2$ reduction using $Cu/Cu_2O$ particles with $Cu/Cu_2O$ interfaces, rather than $Cu_2O$ particles alone.

In the present invention, the advantages of both Cu and $Cu_2O$ are exploited for $CO_2$ reduction. $Cu/Cu_2O$ interfaces minimize their free energy by reconstruction and enhance molecular hydrogen adsorption and activation on $CO_2$-covered atomically rough interfaces in the $CO_2$ electrochemical reduction.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of electrochemical reduction of $CO_2$ or $CO_3^{-2}$ comprising:
    providing an electrochemical cell including an anode, and a cathode including $Cu/Cu_2O$ particles with $Cu/Cu_2O$ interfaces;
    introducing an aqueous medium into the cell, the aqueous medium including $CO_2$ or $CO_3^{-2}$; and
    reducing the $CO_2$ or $CO_3^{-2}$ by contacting the $Cu/Cu_2O$ particles with the aqueous medium while supplying electricity to the cell.

2. The method according to claim 1, wherein the $Cu/Cu_2O$ particles are nanosized.

3. The method according to claim 1, wherein the $Cu/Cu_2O$ particles include 18-facet polyhedral $Cu/Cu_2O$ particles.

4. The method according to claim 3, wherein facets of the $Cu/Cu_2O$ particles have rough surfaces and include the $Cu/Cu_2O$ interfaces.

5. The method according to claim 3, wherein the $Cu/Cu_2O$ particles include twelve (110) facets and six (100) facets.

6. The method according to claim 1, wherein the $Cu/Cu_2O$ particles have an atomic ratio of Cu:O of more than 2:1.

7. The method according to claim 6, wherein the $Cu/Cu_2O$ particles have the atomic ratio of Cu:O of more than 10:1.

8. The method according to claim 1, further comprising preparing the $Cu/Cu_2O$ particles by:
    providing $Cu_2O$ crystals; and
    reacting the $Cu_2O$ crystals with a reducing agent at a predetermined temperature for a predetermined time to thereby form the $Cu/Cu_2O$ particles.

9. The method according to claim 8, wherein:
    the reducing agent includes hydrazine hydrate;
    the predetermined temperature is 50-70° C.; and
    the predetermined time is 1-10 minutes.

10. The method according to claim 8, wherein the $Cu_2O$ crystals are provided by:
    forming a solution including a copper ion contributor dissolved in a solvent;
    heating the solution to a temperature of from 55-65° C.;
    adding a pH adjuster to the solution, wherein the solution has a pH of from 2-12;
    adding a reducing agent to the solution to thereby form a reaction mixture; and
    reacting the reaction mixture at the temperature of from 55-65° C. to thereby precipitate the $Cu_2O$ crystals from the reaction mixture.

11. The method according to claim 10, wherein the $Cu_2O$ crystals include 18-facet polyhedral particles.

12. The method according to claim 11, wherein the $Cu_2O$ crystals have an average particle size of 0.8 μm.

13. The method according to claim 11, wherein the $Cu_2O$ crystals have twelve (110) facets and six (100) facets.

* * * * *